United States Patent
Jiang et al.

(10) Patent No.: US 12,143,053 B2
(45) Date of Patent: Nov. 12, 2024

(54) MOTOR DRIVER USING MOTOR MAGNETIC POLE REFERENCE CONTROLLING MECHANISM

(71) Applicant: ANPEC ELECTRONICS CORPORATION, Hsinchu (TW)

(72) Inventors: Jyun-Ping Jiang, Hsinchu (TW); Shih-Hai Chien, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 139 days.

(21) Appl. No.: 18/179,375

(22) Filed: Mar. 7, 2023

(65) Prior Publication Data
US 2024/0146217 A1 May 2, 2024

(30) Foreign Application Priority Data
Nov. 1, 2022 (TW) .................................. 111141493

(51) Int. Cl.
*H02P 6/185* (2016.01)
*H02K 11/33* (2016.01)

(52) U.S. Cl.
CPC .............. *H02P 6/185* (2013.01); *H02K 11/33* (2016.01)

(58) Field of Classification Search
CPC .. H02P 6/00; H02P 6/005; H02P 6/007; H02P 6/04; H02P 6/06; H02P 6/10; H02P 6/16; H02P 6/17; H02P 6/181; H02P 6/32; H02P 7/29; H02P 25/03; H02P 25/062; H02P 25/064; H02P 27/06; H02P 27/08; H02P 6/153; H02P 6/14; H02P 21/18; H02P 25/022; H02P 21/32; H02P 2203/03; H02P 6/08; H02P 6/12; H02P 6/15; H02P 7/2913; H02K 29/08; G01P 3/44; G01P 3/48

See application file for complete search history.

(56) References Cited

U.S. PATENT DOCUMENTS

2021/0336568 A1* 10/2021 Ikeda ..................... H02P 6/15

* cited by examiner

*Primary Examiner* — Antony M Paul
(74) *Attorney, Agent, or Firm* — Li & Cai Intellectual Property Office

(57) ABSTRACT

A motor driver using a motor magnetic pole reference controlling mechanism is provided. A motor position detecting circuit detects a rotor of a motor to determine a plurality of magnetic pole positions to which the rotor of the motor is switched respectively during a plurality of time intervals. A reference magnetic pole switching circuit selects one of the plurality of time intervals according to a change in rotational speed of the motor over time. The reference magnetic pole switching circuit uses the magnetic pole position to which the rotor of the motor is switched during the one of the plurality of time intervals as magnetic pole reference data. A motor driving circuit drives the motor according to the magnetic pole reference data from the reference magnetic pole switching circuit.

16 Claims, 7 Drawing Sheets

MOTOR DRIVER USING MOTOR MAGNETIC POLE REFERENCE CONTROLLING MECHANISM

CROSS-REFERENCE TO RELATED PATENT APPLICATION

This application claims the benefit of priority to Taiwan Patent Application No. 111141493, filed on Nov. 1, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor driver using a motor magnetic pole reference controlling mechanism.

BACKGROUND OF THE DISCLOSURE

In electronic devices, fans are used to cool heat generating components such as processors. When the heat generating components are cooled down by the fans, motors of the fans must be accurately controlled to rotate such that the fans can properly cool down the heat generating components with efficiency.

Generally, rotors in the motors of the fans are made of permanent magnet materials. In manufacturing processes of each of these motors, areas of a plurality of magnetic pole positions of the rotor are often not evenly distributed and not symmetrical to each other. Under this condition, a conventional motor driver still drives the motor in the same manner, such as to cause an abnormal rotation of the motor, so that the heat generating components cannot be cooled down effectively.

SUMMARY OF THE DISCLOSURE

In response to the above-referenced technical inadequacies, the present disclosure provides a motor driver using a motor magnetic pole reference controlling mechanism. The motor driver includes a motor position detecting circuit, a rotational speed detecting circuit, a reference magnetic pole switching circuit and a motor driving circuit. The motor position detecting circuit is disposed on a motor. The motor position detecting circuit is configured to detect a rotor of the motor to determine a plurality of magnetic pole positions to which the rotor of the motor is switched respectively during a plurality of time intervals in each of a plurality of cycles to output a commutation signal. The rotational speed detecting circuit is configured to detect a rotational speed of the motor that changes over time to output a motor rotational speed changing signal. The reference magnetic pole switching circuit is connected to the motor position detecting circuit and the rotational speed detecting circuit. The reference magnetic pole switching circuit, according to the commutation signal, stores the plurality of magnetic pole positions to which the rotor of the motor is switched respectively during the plurality of time intervals. The reference magnetic pole switching circuit, according to the commutation signal, stores time of the plurality of time intervals during which the rotor of the motor is switched to the plurality of magnetic pole positions respectively as magnetic pole detected data. The reference magnetic pole switching circuit determines a change in the rotational speed of the motor over time, according to the motor rotational speed changing signal. The reference magnetic pole switching circuit selects one of the plurality of time intervals according to the change in the rotational speed of the motor. The reference magnetic pole switching circuit uses the magnetic pole detected data detected within the one of the plurality of time intervals, as the reference magnetic pole data of a next one of the plurality of time intervals.

In certain embodiments, the reference magnetic pole switching circuit samples the rotational speed of the motor that is indicated by the motor rotational speed changing signal at intervals. The reference magnetic pole switching circuit determines the change in the rotational speed of the motor over time, according to the rotational speed of the motor that is sampled respectively at different time points within a sampling time interval. The reference magnetic pole switching circuit selects the one of the plurality of time intervals according to the change in the rotational speed of the motor over time.

In certain embodiments, the reference magnetic pole switching circuit continuously samples the rotational speed of the motor that is indicated by the motor rotational speed changing signal for multiple times to determine the change in the rotational speed of the motor over time within a sampling time interval.

In certain embodiments, the reference magnetic pole switching circuit, according to the motor rotational speed changing signal, determines whether or not a transient change is occurring in the rotational speed of the motor to select the one of the plurality of time intervals.

In certain embodiments, when the reference magnetic pole switching circuit determines that the rotational speed of the motor is in a steady state according to the motor rotational speed changing signal, the reference magnetic pole switching circuit uses the time interval during which the rotor of the motor is switched to one of the plurality of magnetic pole positions in one of the plurality of cycles, as the reference magnetic pole data of the time interval during which the rotor of the motor is switched to the one of the plurality of magnetic pole positions in a next one of the plurality of cycles.

In certain embodiments, when the reference magnetic pole switching circuit determines that the rotational speed of the motor is in a steady state according to the motor rotational speed changing signal, the reference magnetic pole switching circuit uses an average value of the time intervals during which the rotor of the motor is switched to some of the plurality of magnetic pole positions respectively in one of the plurality of cycles, as the reference magnetic pole data of the time intervals during which the rotor of the motor is switched to the some of the plurality of magnetic pole positions respectively in a next one of the plurality of cycles.

In certain embodiments, when the reference magnetic pole switching circuit determines that the rotational speed of the motor is in a steady state according to the motor rotational speed changing signal, the reference magnetic pole switching circuit uses an average value of the plurality of time intervals during which the rotor of the motor is switched respectively to all of the plurality of magnetic pole positions in one of the plurality of cycles, as the reference magnetic pole data of the plurality of time intervals during which the rotor of the motor is switched respectively to all of the plurality of magnetic pole positions in a next one of the plurality of cycles.

In certain embodiments, when the reference magnetic pole switching circuit determines that the rotational speed of the motor is in a steady state according to the motor rotational speed changing signal, the reference magnetic pole switching circuit uses an average value of the time intervals during which the rotor of the motor is switched to some of the plurality of magnetic pole positions respectively in one of the plurality of cycles, as the reference magnetic pole data of the time intervals during which the rotor of the motor is switched to others of the plurality of magnetic pole positions in the one of the plurality of cycles.

In certain embodiments, when the reference magnetic pole switching circuit determines that a transient change is occurring in the rotational speed of the motor rotating within one of the plurality of time intervals according to the motor rotational speed changing signal, the reference magnetic pole switching circuit selects a previous one of the plurality of time intervals, and uses the magnetic pole detected data detected within the previous one of the plurality of time intervals as the reference magnetic pole data of the one of the plurality of time intervals.

In certain embodiments, when the reference magnetic pole switching circuit determines that a transient change is occurring in the rotational speed of the motor according to the motor rotational speed changing signal, the motor driving circuit adjusts a commutation time of the motor according to the reference magnetic pole data.

In certain embodiments, the motor driving circuit is connected to the motor position detecting circuit. The motor driving circuit is configured to drive the motor according to both of the commutation signal and the reference magnetic pole data.

In certain embodiments, the motor driving circuit includes a control circuit, a driving circuit and an output stage circuit. The control circuit is connected to the reference magnetic pole switching circuit. The driving circuit is connected to the control circuit. The output stage circuit is connected to the driving circuit and the motor. The control circuit is configured to control the driving circuit to drive the output stage circuit so as to drive the motor according to the reference magnetic pole data from the reference magnetic pole switching circuit.

In certain embodiments, the output stage circuit includes a plurality of switch components. The plurality of switch components includes a plurality of high-side switches and a plurality of low-side switches.

In certain embodiments, when the reference magnetic pole switching circuit determines that a transient change is occurring in the rotational speed of the motor according to the motor rotational speed changing signal, the control circuit controls the driving circuit to extend a period of time within which one or more of the plurality of low-side switches are turned off according to the reference magnetic pole data.

In certain embodiments, when the reference magnetic pole switching circuit determines that a transient change is occurring in the rotational speed of the motor according to the motor rotational speed changing signal, the control circuit controls the driving circuit to extend a period of time within which one or more of the plurality of switch components are switched according to the reference magnetic pole data.

In certain embodiments, the rotational speed detecting circuit is connected to the motor position detecting circuit. When the rotational speed detecting circuit receives the commutation signal from the motor position detecting circuit and detects the rotational speed of the motor to output the motor rotational speed changing signal, the rotational speed detecting circuit controls the reference magnetic pole switching circuit to store the magnetic pole position at which the rotor of the motor rotates at a current rotational speed as the magnetic pole detected data.

As described above, the present disclosure provides the motor driver using the motor magnetic pole reference controlling mechanism. The motor driver of the present disclosure, according to the change (such as the transient change or the steady state) in the rotational speed of the motor, selects one of the plurality of time intervals during which the rotor of the motor is switched respectively. The motor driver of the present disclosure uses the data related to the magnetic pole positions detected within the one of the plurality of time intervals as the reference magnetic pole data. The motor driver of the present disclosure effectively drives the motor to rotate according to the reference magnetic pole data.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
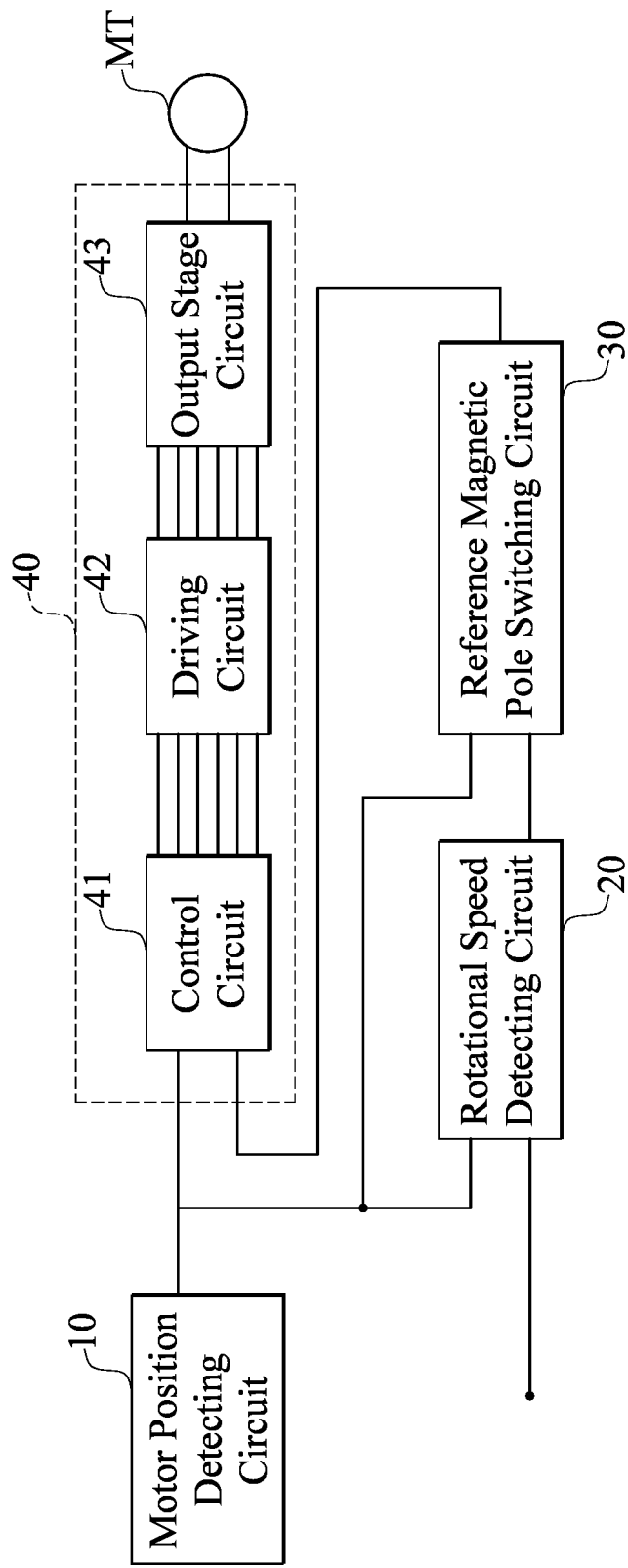
FIG. 1 is a block diagram of a motor driver using a motor magnetic pole reference controlling mechanism according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
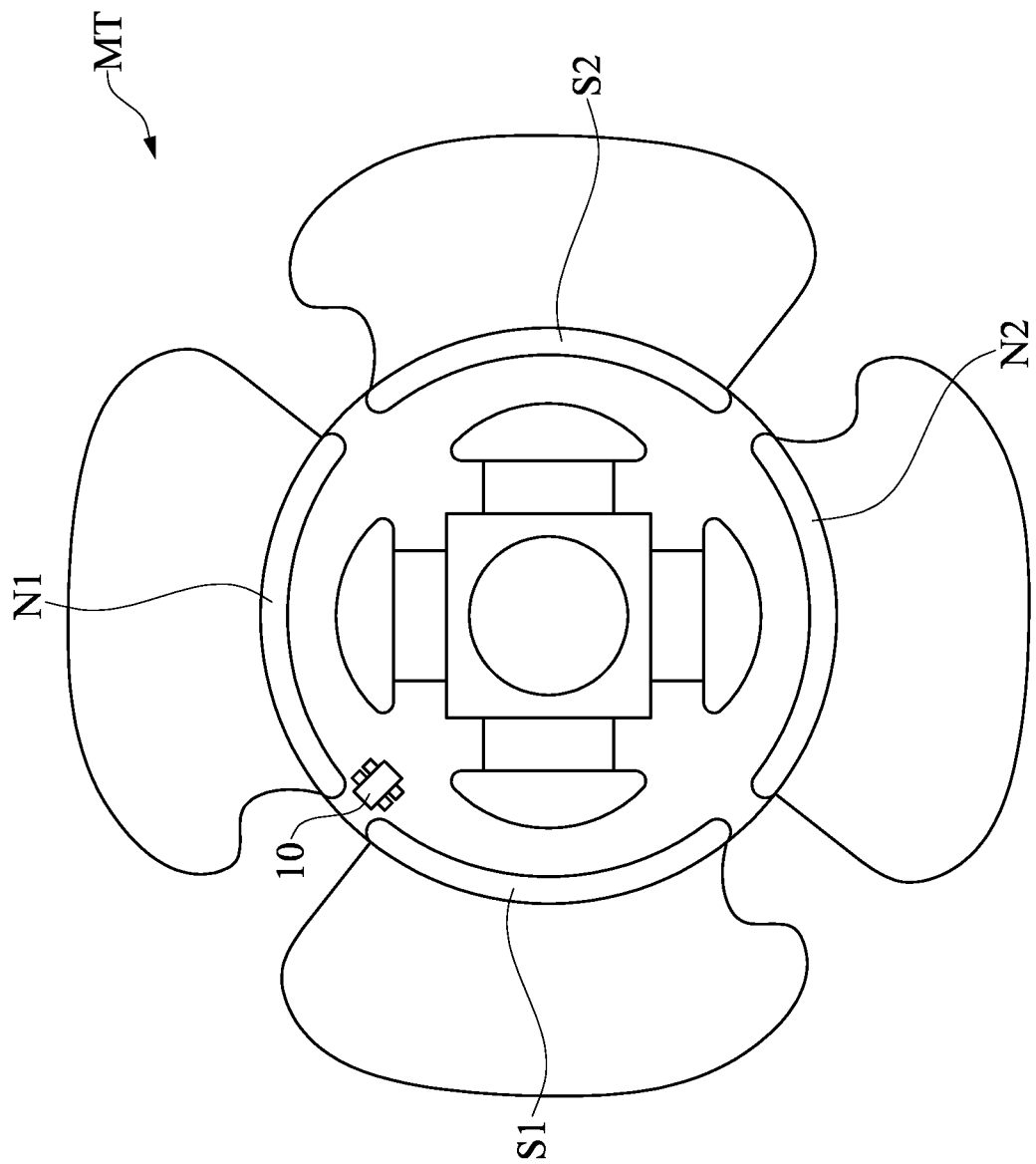
FIG. 2 is a schematic diagram of a motor detected by the motor driver using the motor magnetic pole reference controlling mechanism according to the embodiment of the present disclosure.
Figure 3:
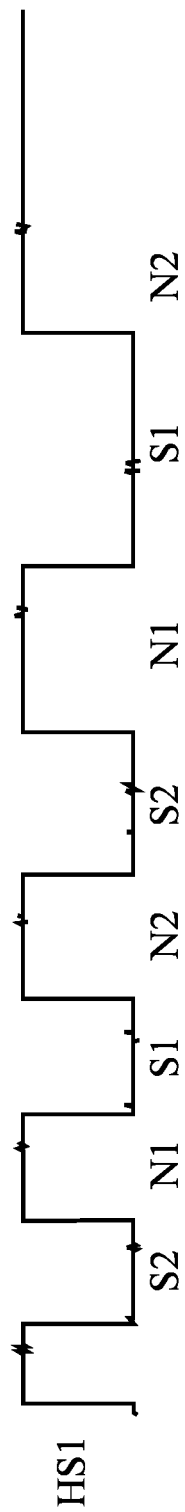
FIG. 3 is a waveform diagram of a signal generated by the motor driver using the motor magnetic pole reference controlling mechanism according to the embodiment of the present disclosure.
Figure 4:
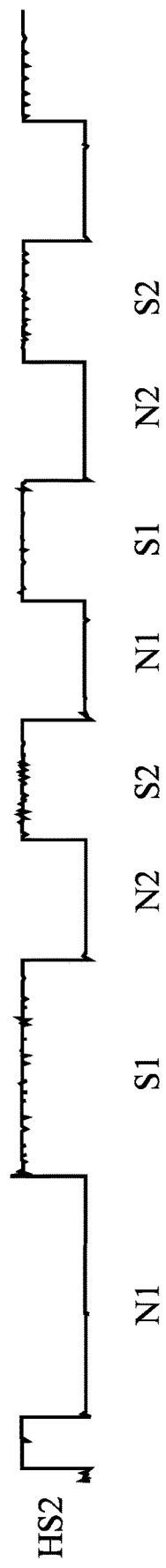
FIG. 4 is a waveform diagram of a signal generated by the motor driver using the motor magnetic pole reference controlling mechanism according to the embodiment of the present disclosure.
Figure 5:
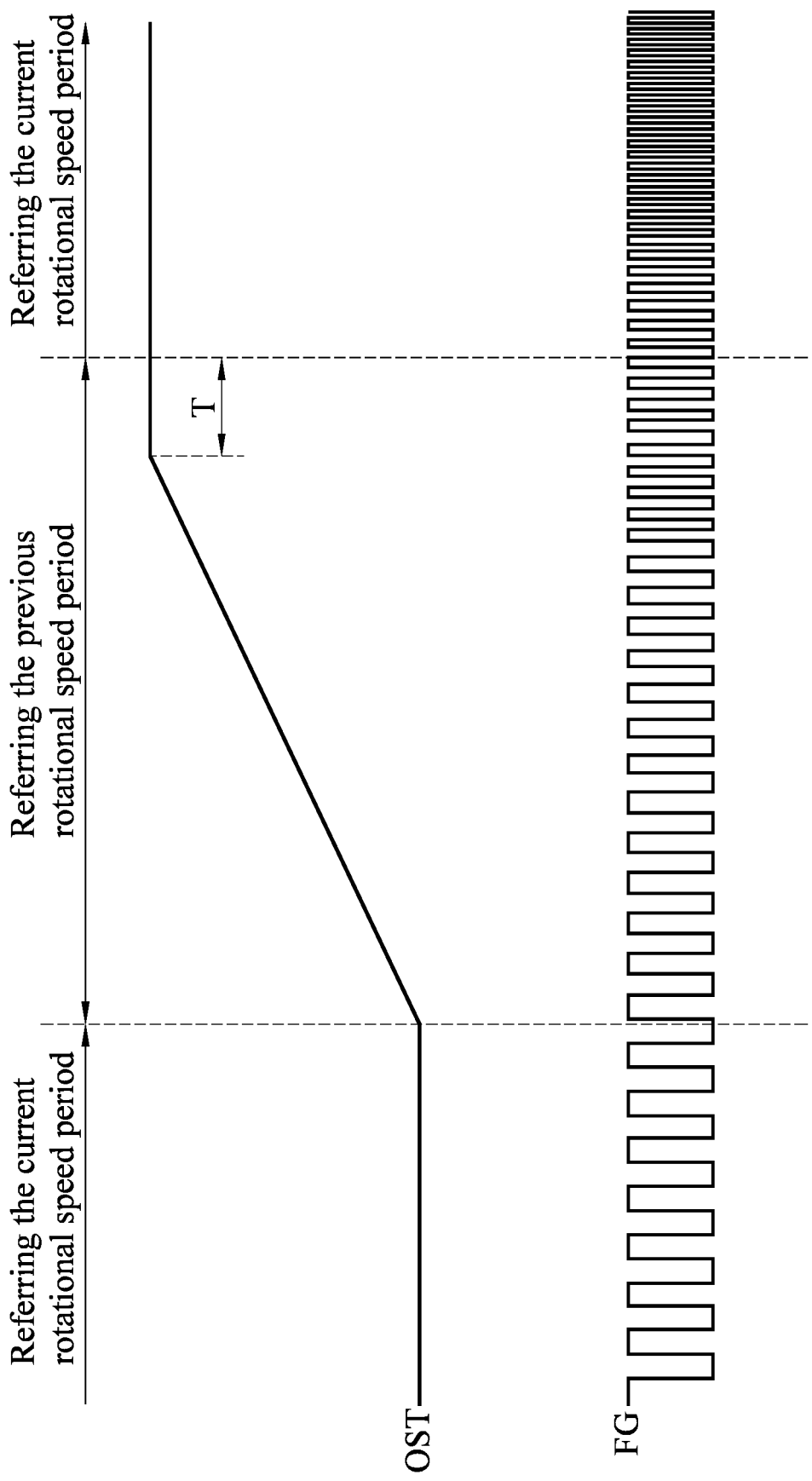
FIG. 5 is a waveform diagram of a signal generated by the motor driver using the motor magnetic pole reference controlling mechanism when rotational speed of the motor is switched from low speed to high speed and a time during which the motor continually rotates at the high speed reaches a preset time according to the embodiment of the present disclosure.

Reference is made to FIGS. 1 to 5, in which FIG. 1 is a block diagram of a motor driver using a motor magnetic pole reference controlling mechanism according to an embodiment of the present disclosure, FIG. 2 is a schematic diagram of a motor detected by the motor driver using the motor magnetic pole reference controlling mechanism according to the embodiment of the present disclosure, FIGS. 3 and 4 are waveform diagrams of signals generated by the motor driver using the motor magnetic pole reference controlling mechanism according to the embodiment of the present disclosure, and FIG. 5 is a waveform diagram of a signal generated by the motor driver using the motor magnetic pole reference controlling mechanism when rotational speed of the motor is switched from low speed to high speed and time during which the motor continually rotates at the high speed reaches preset time according to the embodiment of the present disclosure.

The motor driver of the embodiment of the present disclosure may include a motor position detecting circuit 10, a rotational speed detecting circuit 20, a reference magnetic pole switching circuit 30 and a motor driving circuit 40 as shown in FIG. 1. The motor driving circuit 40 may include a control circuit 41, a driving circuit 42 and an output stage circuit 43.

As shown in FIG. 1, the motor position detecting circuit 10 may be connected to the rotational speed detecting circuit 20, the reference magnetic pole switching circuit 30 and the control circuit 41. The reference magnetic pole switching circuit 30 may be connected to the rotational speed detecting circuit 20 and the control circuit 41. The driving circuit 42 may be connected to the control circuit 41 and the output stage circuit 43. The output stage circuit 43 is connected to a motor MT.

The motor position detecting circuit 10 may include one or more Hall sensors, and may be disposed on the motor MT as shown in FIG. 2. The motor position detecting circuit 10 may detect a rotor of the motor MT to determine a plurality of magnetic pole positions to which the rotor of the motor MT is switched respectively during a plurality of time intervals in each of a plurality of cycles to output a commutation signal. For example, the motor position detecting circuit 10 may output a commutation signal HS1 as shown in FIG. 3 or a commutation signal HS2 as shown in FIG. 4, but the present disclosure is not limited thereto.

Generally, the rotor of the motor MT is switched between 2P magnetic pole positions, wherein P is a positive integer value being larger than 1. For example, as shown in FIG. 2, the rotor of the motor MT is switched between four magnetic pole positions N1, S1, N2, S2 such that the motor MT commutates, but the present disclosure is not limited thereto.

A plurality of working periods and a plurality of non-working periods of a plurality of waveforms of the commutation signal (such as the commutation signal HS1 as shown in FIG. 3 or the commutation signal HS2 as shown in FIG. 4) that is outputted by the motor position detecting circuit 10 are the plurality of time intervals respectively during which the rotor of the motor MT is switched to the plurality of magnetic pole positions (such as the four magnetic pole positions N1, S1, N2, S2).

In an optimal state, areas occupied respectively by the plurality of magnetic pole positions of the rotor in the motor MT should be equal to each other and asymmetrical to each other. For example, the four pole positions N1, S1, N2, S2 should be evenly distributed such that each of the four pole positions N1, S1, N2, S2 occupies a quarter of a total area occupied by all of the pole positions N1, S1, N2, S2 of the rotor of the motor MT. Under this condition, if the motor MT continually rotates at the same rotational speed, in the commutation signal outputted by the motor position detecting circuit 10, time lengths of the plurality of time intervals respectively during which the rotor of the motor MT is switched to the plurality of magnetic pole positions N1, S1, N2, S2 are equal to each other.

However, in an actual state, the areas respectively occupied by the plurality of magnetic pole positions of the rotor of the motor MT may be not equal to each other and not symmetrical to each other. For example, the four pole positions N1, S1, N2, S2 are not evenly distributed in the motor MT, and any one of the four pole positions N1, S1, N2, S2 does not occupy the quarter of the total area occupied by all of the pole positions N1, S1, N2, S2 of the rotor of the motor MT. As a result, in the commutation signal (such as the commutation signal HS1 as shown in FIG. 3 or the commutation signal HS2 as shown in FIG. 4) outputted by the motor position detecting circuit 10, the time lengths of the plurality of time intervals respectively during which the rotor of the motor MT is switched to the plurality of magnetic pole positions N1, S1, N2, S2 are not equal to each other.

Therefore, the motor driver of the present disclosure detects the motor MT to determine the rotational speed of the motor MT and the plurality of magnetic pole positions N1, S1, N2, S2 to which the rotor of the motor MT is switched sequentially over time, and accordingly dynamically adjusts driving operations performed on the motor MT in real time, as described in detail in the following.

When the motor position detecting circuit 10 determines which one of the plurality of magnetic pole positions N1, S1, N2, S2 is a position to which the motor MT is currently switched, the rotational speed detecting circuit 20 may directly detect the rotational speed of the motor MT or detect a motor rotational speed controlling signal from an external circuit to determine the rotational speed of the motor MT to output a motor rotational speed changing signal such as a motor rotational speed changing signal FG as shown in FIG. 5.

The reference magnetic pole switching circuit 30 may, according to the commutation signal from the motor position detecting circuit 10, store the plurality of magnetic pole positions to which the rotor of the motor MT is switched respectively during each of the plurality of time intervals, and time of the plurality of time intervals during which the rotor of the motor is switched respectively to the plurality of magnetic pole positions, as magnetic pole detected data.

If necessary, the rotational speed detecting circuit 20 may be further connected to the motor position detecting circuit 10. When the rotational speed detecting circuit 20 receives the commutation signal from the motor position detecting circuit 10 and detects the rotational speed of the motor MT to output the motor rotational speed changing signal, the rotational speed detecting circuit 20 may control the reference magnetic pole switching circuit 30 to store the magnetic pole position to which the rotor of the motor MT rotating at the detected rotational speed is switched as magnetic pole detected data.

The reference magnetic pole switching circuit 30, according to the motor rotational speed changing signal, determines a change in the rotational speed of the motor MT over time to select one of the plurality of time intervals and use the magnetic pole detected data detected within the one of the plurality of time intervals as reference magnetic pole data of a next one of the plurality of time intervals.

In detail, the reference magnetic pole switching circuit 30 may sample the rotational speed of the motor MT indicated by the motor rotational speed changing signal at intervals. Then, the reference magnetic pole switching circuit 30, according to the rotational speed of the motor MT sampled at discontinuous time points within a sampling time interval, determines a change in the rotational speed of the motor MT over time. Then, the reference magnetic pole switching circuit 30, according to the change in the rotational speed of the motor MT over time, selects one of the plurality of time intervals and uses the magnetic pole detected data detected within the one of the plurality of time intervals as the reference magnetic pole data of a next one of the plurality of time intervals.

Alternatively, the reference magnetic pole switching circuit 30 may continuously sample the rotational speed of the motor MT indicated by the motor rotational speed changing signal for multiple times. Then, the reference magnetic pole switching circuit 30, according to the rotational speed of the motor MT sampled multiple times within the sampling time interval, determines the change in the rotational speed of the motor MT over time. Then, the reference magnetic pole switching circuit 30, according to the change in the rotational speed of the motor MT over time, selects one of the plurality of time intervals and uses the magnetic pole detected data detected within the one of the plurality of time intervals as the reference magnetic pole data of a next one of the plurality of time intervals.

The reference magnetic pole switching circuit 30 may, according to the motor rotational speed changing signal such as the motor rotational speed changing signal FG as shown in FIG. 5, determine whether or not a transient change is occurring in the rotational speed of the motor MT or the rotational speed of the motor MT is in a steady state, and accordingly determine the reference magnetic pole data.

It is worth noting that, when the reference magnetic pole switching circuit 30 determines that the transient change is occurring in the rotational speed of the motor MT rotating within one of the plurality of time intervals according to the motor rotational speed changing signal, the reference magnetic pole switching circuit 30 selects a previous one of the plurality of time intervals (that is adjacent to the one of the plurality of time intervals). Then, the reference magnetic pole switching circuit 30 uses the magnetic pole detected data detected within the previous one of the plurality of time intervals, as the reference magnetic pole data of the one of the plurality of time intervals.

The control circuit 41 may output one or more control signals according to the reference magnetic pole data from the magnetic pole reference switching circuit 30 (and/or the commutation signal from the motor position detecting circuit 10). The driving circuit 42 may output one or more driving signals according to the one or more control signals from the control circuit 41. The output stage circuit 43 may operate to drive the motor MT to rotate according to the one or more driving signals from the driving circuit 42.

For example, the output stage circuit 43 may include a plurality of switch components. The plurality of switch components of the output stage circuit 43 may include a plurality of high-side switches and a plurality of low-side switches.

When the reference magnetic pole switching circuit 30 determines that the transient change is occurring in the rotational speed of the motor MT according to the motor rotational speed changing signal, the motor driving circuit 40 may perform a corresponding operation according to the reference magnetic pole data. For example, the control circuit 41 may, according to the reference magnetic pole data, control the driving circuit 42 to extend a period of time within which the low-side switches of the output stage circuit 43 are turned off. Alternatively, the control circuit 41 may, according to the reference magnetic pole data, control the driving circuit 42 to adjust time within which one or more of the plurality of switch components (such as the high-side switches and the low-side switches) of the output stage circuit 43 are switched. Alternatively, the control circuit 41 may adjust (for example, delay) commutation time of the motor MT according to the reference magnetic pole data.

For example, as indicated by a rotational speed state signal OST shown in FIG. 5, after the rotational speed of the motor MT is increased from low speed to high speed and is maintained at the high speed for a fixed waiting time T, one or more of the plurality of switch components of the output stage circuit 43 are switched from a transient change control mode to a steady state control mode, but the present disclosure is not limited thereto.

Figure 6:
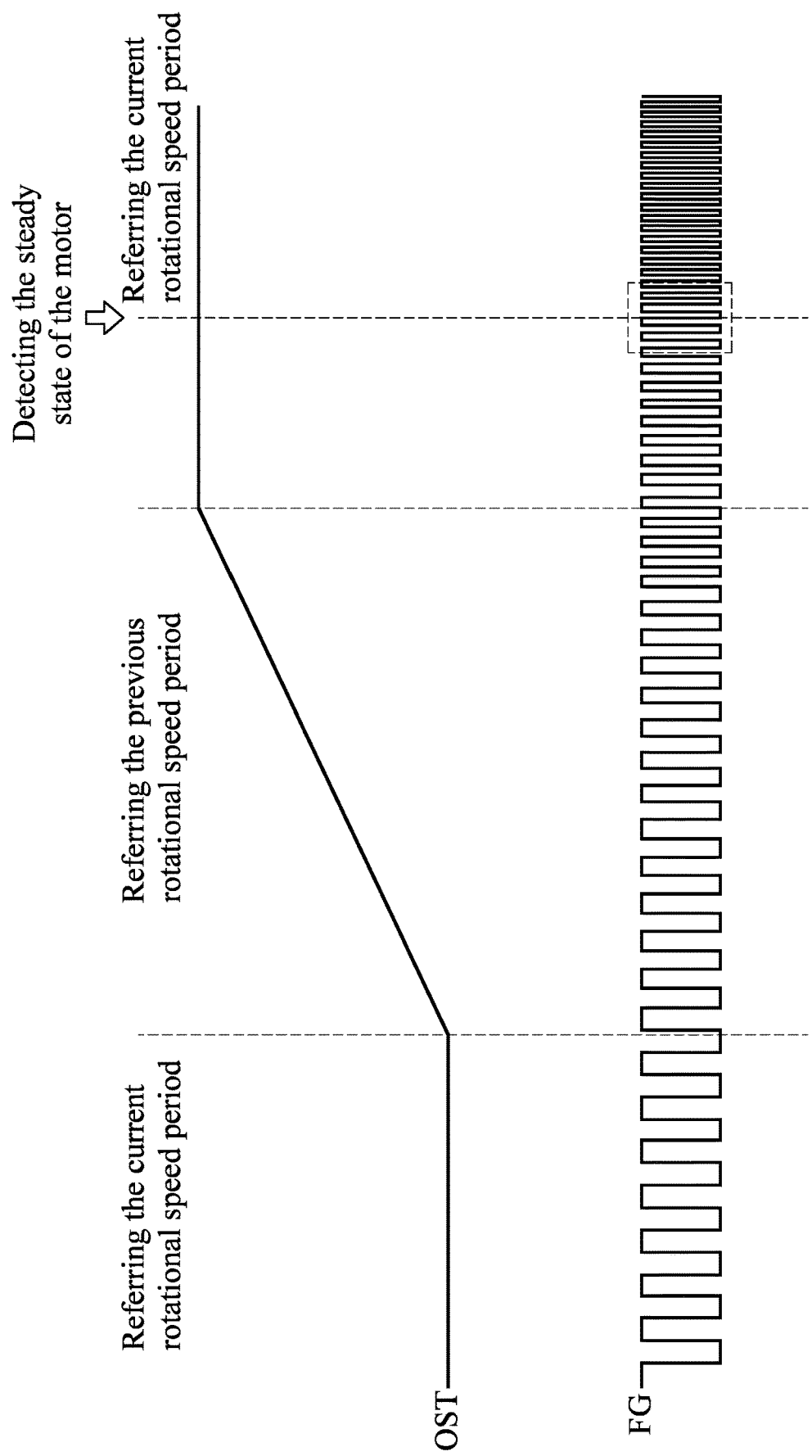
FIG. 6 is a waveform diagram of a signal generated by the motor driver using the motor magnetic pole reference controlling mechanism when the rotational speed of the motor is switched from the low speed to the high speed and then is not changed or is only slightly changed according to the embodiment of the present disclosure.

Reference is made to FIG. 6, which is a waveform diagram of a signal generated by the motor driver using the motor magnetic pole reference controlling mechanism when the rotational speed of the motor is switched from the low speed to the high speed and then is not changed or is only slightly changed according to the embodiment of the present disclosure.

As shown in FIG. 5, a time point at which the motor MT is switched from the transient change control mode to the steady state control mode by the motor driver of the present disclosure depends on the fixed waiting time T. However, the fixed waiting time T is not suitable for some fans rotating at different rotational speeds in other applications. Therefore, the time point at which the motor MT is switched from the transient change control mode to the steady state control mode by the motor driver of the present disclosure may also depend on other conditions, as described in the following.

The rotational speed detecting circuit 20 shown in FIG. 1 detects the motor rotational speed changing signal FG as shown in FIG. 6 to determine time differences between N previous time intervals and M subsequent time intervals of the time interval during which the motor MT rotates at a current rotational speed. For example, the rotational speed detecting circuit 20 determines a time difference between one (N=1) previous time interval and one (M=1) subsequent time interval of the time interval during which the motor MT rotates at the current rotational speed, but the present disclosure is not limited thereto. For example, the rotational speed detecting circuit 20 determines time differences between four (N=4) previous time intervals and four (M=4) subsequent time intervals of the time interval during which the motor MT rotates at the current rotational speed, but the present disclosure is not limited thereto.

As indicated by the rotational speed state signal OST and the motor rotational speed changing signal FG shown in FIG. 6, each of the time differences between the N previous time intervals and the M subsequent time intervals of the time interval during which the motor MT rotates at the current rotational speed is generally reduced to be smaller than a time threshold (such as a zero value). At this time, one or more of the plurality of switch components of the output stage circuit 43 of the motor driver of the present disclosure are switched from the transient change control mode to the steady state control mode.

Figure 7:
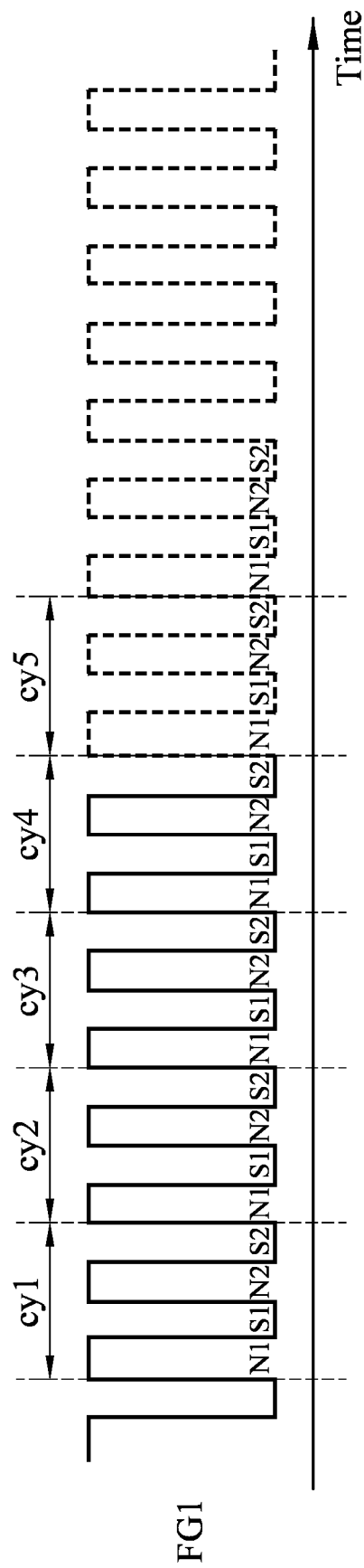
FIG. 7 is a waveform diagram of a motor rotational speed changing signal detected by the motor driver using the motor magnetic pole reference controlling mechanism when the motor rotates in a steady state according to the embodiment of the present disclosure.

Reference is made to FIG. 7, which is a waveform diagram of a motor rotational speed changing signal detected by the motor driver using the motor magnetic pole reference controlling mechanism when the motor rotates in a steady state according to the embodiment of the present disclosure.

The reference magnetic pole switching circuit 30 shown in FIG. 1, according to a motor rotational speed changing signal FG1 detected by the rotational speed detecting circuit 20, determines that the rotational speed of the motor MT is in the steady state as shown in FIG. 7. Under this condition, the reference magnetic pole switching circuit 30 uses the time interval during which the rotor of the motor MT is switched to one of the plurality of magnetic pole positions in one of the plurality of cycles, as the reference magnetic pole data of the time interval during which the rotor of the motor MT is switched to the one of the plurality of magnetic pole positions in a next one of the plurality of cycles.

For example, as shown in FIG. 7, the reference magnetic pole switching circuit 30 may store the time interval during which the rotor of the motor MT is switched to the magnetic pole position N1 in a first cycle cy1, as the reference magnetic pole data of the time interval during which the rotor of the motor MT is switched to the magnetic pole position N1 in a second cycle cy2 (that is a next cycle of the first cycle cy1).

The reference magnetic pole switching circuit 30 may store the time interval during which the rotor of the motor MT is switched to the magnetic pole position N1 in the second cycle cy2, as the reference magnetic pole data of the time interval during which the rotor of the motor MT is switched to the magnetic pole position N1 in a third cycle cy3 (that is a next cycle of the second cycle cy2).

The reference magnetic pole switching circuit 30 may store the time interval during which the rotor of the motor MT is switched to the magnetic pole position N1 in the third cycle cy3, as the reference magnetic pole data of the time interval during which the rotor of the motor MT is switched to the magnetic pole position N1 in a fourth cycle cy4 (that is a next cycle of the third cycle cy3).

On the other hand, the reference magnetic pole switching circuit 30 may store the time interval during which the rotor of the motor MT is switched to the magnetic pole position S1 in the first cycle cy1, as the reference magnetic pole data of the time interval during which the rotor of the motor MT is switched to the magnetic pole position S1 in the second cycle cy2.

The reference magnetic pole switching circuit 30 may store the time interval during which the rotor of the motor MT is switched to the magnetic pole position S1 in the second cycle cy2, as the reference magnetic pole data of the time interval during which the rotor of the motor MT is switched to the magnetic pole position S1 in the third cycle cy3.

The reference magnetic pole switching circuit 30 may store the time interval during which the rotor of the motor MT is switched to the magnetic pole position S1 in the third cycle cy3, as the reference magnetic pole data of the time interval during which the rotor of the motor MT is switched to the magnetic pole position S1 in the fourth cycle cy4.

On the other hand, the reference magnetic pole switching circuit 30 may store the time interval during which the rotor of the motor MT is switched to the magnetic pole position N2 in the first cycle cy1, as the reference magnetic pole data of the time interval during which the rotor of the motor MT is switched to the magnetic pole position N2 in the second cycle cy2.

The reference magnetic pole switching circuit 30 may store the time interval during which the rotor of the motor MT is switched to the magnetic pole position N2 in the second cycle cy2, as the reference magnetic pole data of the time interval during which the rotor of the motor MT is switched to the magnetic pole position N2 in the third cycle cy3.

The reference magnetic pole switching circuit 30 may store the time interval during which the rotor of the motor MT is switched to the magnetic pole position N2 in the third cycle cy3, as the reference magnetic pole data of the time interval during which the rotor of the motor MT is switched to the magnetic pole position N2 in the fourth cycle cy4.

On the other hand, the reference magnetic pole switching circuit 30 may store the time interval during which the rotor of the motor MT is switched to the magnetic pole position S2 in the first cycle cy1, as the reference magnetic pole data of the time interval during which the rotor of the motor MT is switched to the magnetic pole position S2 in the second cycle cy2.

The reference magnetic pole switching circuit 30 may store the time interval during which the rotor of the motor MT is switched to the magnetic pole position S2 in the second cycle cy2, as the reference magnetic pole data of the time interval during which the rotor of the motor MT is switched to the magnetic pole position S2 in the third cycle cy3.

The reference magnetic pole switching circuit 30 may store the time interval during which the rotor of the motor MT is switched to the magnetic pole position S2 in the third cycle cy3, as the reference magnetic pole data of the time interval during which the rotor of the motor MT is switched to the magnetic pole position S2 in the fourth cycle cy4.

Further, the reference magnetic pole switching circuit 30 may store the time interval during which the rotor of the motor MT shown in FIG. 1 or FIG. 2 is switched to the magnetic pole position N1 in one of the plurality of cycles (such as the fourth cycle cy4), as the reference magnetic pole data of the time interval during which the rotor of the motor MT is switched to the magnetic pole position N1 in a next one of the plurality of cycles (such as the fifth cycle cy5).

The reference magnetic pole switching circuit 30 may store the time interval during which the rotor of the motor MT shown in FIG. 1 or FIG. 2 is switched to the magnetic pole position S1 in one of the plurality of cycles (such as the fourth cycle cy4), as the reference magnetic pole data of the time interval during which the rotor of the motor MT is switched to the magnetic pole position S1 in a next one of the plurality of cycles (such as the fifth cycle cy5).

The reference magnetic pole switching circuit 30 may store the time interval during which the rotor of the motor MT shown in FIG. 1 or FIG. 2 is switched to the magnetic pole position N2 in one of the plurality of cycles (such as the fourth cycle cy4), as the reference magnetic pole data of the time interval during which the rotor of the motor MT is switched to the magnetic pole position N2 in a next one of the plurality of cycles (such as the fifth cycle cy5).

The reference magnetic pole switching circuit 30 may store the time interval during which the rotor of the motor MT shown in FIG. 1 or FIG. 2 is switched to the magnetic pole position S2 in one of the plurality of cycles (such as the fourth cycle cy4), as the reference magnetic pole data of the time interval during which the rotor of the motor MT is switched to the magnetic pole position S2 in a next one of the plurality of cycles (such as the fifth cycle cy5).

Alternatively, when the reference magnetic pole switching circuit 30 determines that the rotational speed of the motor MT is in the steady state according to the motor rotational speed changing signal such as the motor rotational speed changing signal FG1, the reference magnetic pole switching circuit 30 may calculate an average value of the time intervals during which the rotor of the motor MT is switched to some of the plurality of magnetic pole positions respectively in one of the plurality of cycles, as the reference magnetic pole data of the plurality of time intervals respectively during which the rotor of the motor MT is switched to the some of the plurality of magnetic pole positions in a next one of the plurality of cycles.

For example, the reference magnetic pole switching circuit 30 may calculate and store an average value of the two time intervals during which the rotor of the motor MT is switched to the two magnetic pole positions N1 and S1, respectively, in the first cycle cy1, as the reference magnetic pole data of each of the time intervals during which the rotor of the motor MT is switched to the two magnetic pole positions N and S1 in the second cycle cy2 (that is the next cycle of the first cycle cy1).

The reference magnetic pole switching circuit 30 may calculate and store an average value of the two time intervals during which the rotor of the motor MT is switched to the two magnetic pole positions N2 and S2 respectively in the first cycle cy1, as the reference magnetic pole data of each of the time intervals during which the rotor of the motor MT is switched to the two magnetic pole positions N2 and S2 in the second cycle cy2.

The reference magnetic pole switching circuit 30 may calculate and store an average value of the two time intervals during which the rotor of the motor MT is switched to the two magnetic pole positions N1 and S1 respectively in the second cycle cy2, as the reference magnetic pole data of each of the time intervals during which the rotor of the motor MT is switched to the two magnetic pole positions N1 and S1 in the third cycle cy3.

The reference magnetic pole switching circuit 30 may calculate and store an average value of the two time intervals during which the rotor of the motor MT is switched to the two magnetic pole positions N2 and S2 respectively in the second cycle cy2, as the reference magnetic pole data of each of the time intervals during which the rotor of the motor MT is switched to the two magnetic pole positions N2 and S2 in the third cycle cy3.

Alternatively, when the reference magnetic pole switching circuit 30 determines that the rotational speed of the motor MT is in the steady state according to the motor rotational speed changing signal such as the motor rotational speed changing signal FG1, the reference magnetic pole switching circuit 30 may calculate an average value of the plurality of time intervals during which the rotor of the motor MT is switched to all of the plurality of magnetic pole positions respectively in one of the plurality of cycles, as the reference magnetic pole data of the plurality of time intervals during which the rotor of the motor MT is switched to all of the plurality of magnetic pole positions in a next one of the plurality of cycles.

For example, the reference magnetic pole switching circuit 30 may calculate and store an average value of the plurality of time intervals during which the rotor of the motor MT is switched to the plurality of magnetic pole positions N1, S1, N2, S2 respectively in the first cycle cy1, as the reference magnetic pole data of the plurality of time intervals during which the rotor of the motor MT is switched to all of the plurality of magnetic pole positions N1, S1, N2, S2 in the second cycle cy2 (that is the next cycle of the first cycle cy1).

As shown in FIG. 1, the motor driving circuit 40 may drive the motor MT according to the reference magnetic pole data from the reference magnetic pole switching circuit 30 in the next one of the plurality of cycles.

Alternatively, when the reference magnetic pole switching circuit 30 determines that the rotational speed of the motor MT is in the steady state according to the motor rotational speed changing signal such as the motor rotational speed changing signal FG1, the reference magnetic pole switching circuit 30 may calculate an average value of the plurality of time intervals during which the rotor of the motor MT is switched to some of the plurality of magnetic pole positions respectively in one of the plurality of cycles, as the reference magnetic pole data of the plurality of time intervals during which the rotor of the motor MT is switched to others of the plurality of magnetic pole positions in the one of the plurality of cycles.

For example, when the rotational speed of the motor MT is in the steady state, the reference magnetic pole switching circuit 30 may calculate an average value of the time intervals during which the rotor of the motor MT is switched to the magnetic pole positions N1 and S1 respectively in the first cycle cy1, as the reference magnetic pole data of the time intervals during which the rotor of the motor MT is switched to the magnetic pole positions N2 and S2 respectively in the first cycle cy1.

Then, the reference magnetic pole switching circuit 30 may calculate an average value of the time intervals during which the rotor of the motor MT is switched to the magnetic pole positions N1 and S1 respectively in the second cycle cy2, as the reference magnetic pole data of the time intervals during which the rotor of the motor MT is switched to the magnetic pole positions N2 and S2 respectively in the second cycle cy2.

Then, the reference magnetic pole switching circuit 30 may calculate an average value of the time intervals during which the rotor of the motor MT is switched to the magnetic pole positions N1 and S1 respectively in the third cycle cy3, as the reference magnetic pole data of the time intervals during which the rotor of the motor MT is switched to the magnetic pole positions N2 and S2 respectively in the third cycle cy3.

Then, the reference magnetic pole switching circuit 30 may calculate an average value of the time intervals during which the rotor of the motor MT is switched to the magnetic pole positions N1 and S1 respectively in the fourth cycle cy4, as the reference magnetic pole data of the time intervals during which the rotor of the motor MT is switched to the magnetic pole positions N2 and S2 respectively in the fourth cycle cy4.

Then, the reference magnetic pole switching circuit 30 may calculate an average value of the time intervals during which the rotor of the motor MT is switched to the magnetic pole positions N2 and S2 respectively in the fourth cycle cy4, as the reference magnetic pole data of the time intervals during which the rotor of the motor MT is switched to the magnetic pole positions N1 and S1 respectively in the fifth cycle cy5.

Then, the reference magnetic pole switching circuit 30 may calculate an average value of the time intervals during which the rotor of the motor MT is switched to the magnetic pole positions N1 and S1 respectively in the fifth cycle cy5, as the reference magnetic pole data of the time intervals during which the rotor of the motor MT is switched to the magnetic pole positions N2 and S2 respectively in the fifth cycle cy5.

Then, the reference magnetic pole switching circuit 30 may calculate an average value of the time intervals during which the rotor of the motor MT is switched to the magnetic pole positions N2 and S2 respectively in the fifth cycle cy5, as the reference magnetic pole data of the time intervals during which the rotor of the motor MT is switched to the magnetic pole positions N1 and S1 in a next cycle of the fifth cycle cy5.

In conclusion, the present disclosure provides the motor driver using the motor magnetic pole reference controlling mechanism. The motor driver of the present disclosure, according to the change (such as the transient change or the steady state) in the rotational speed of the motor, selects one of the plurality of time intervals during which the rotor of the motor is switched respectively. The motor driver of the present disclosure uses the data related to the magnetic pole positions detected within the one of the plurality of time intervals as the reference magnetic pole data. The motor driver of the present disclosure effectively drives the motor to rotate according to the reference magnetic pole data.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver using a motor magnetic pole reference controlling mechanism, comprising:
   a motor position detecting circuit disposed on a motor, and configured to detect a rotor of the motor to determine a plurality of magnetic pole positions to which the rotor of the motor is switched respectively during a plurality of time intervals in each of a plurality of cycles to output a commutation signal;
   a rotational speed detecting circuit configured to detect a rotational speed of the motor that changes over time to output a motor rotational speed changing signal;
   a reference magnetic pole switching circuit connected to the motor position detecting circuit and the rotational speed detecting circuit, wherein the reference magnetic pole switching circuit stores the plurality of magnetic pole positions to which the rotor of the motor is switched respectively during the plurality of time intervals according to the commutation signal, the reference magnetic pole switching circuit stores time of the plurality of time intervals during which the rotor of the motor is switched to the plurality of magnetic pole positions respectively as magnetic pole detected data according to the commutation signal, the reference magnetic pole switching circuit determines a change in the rotational speed of the motor over time according to the motor rotational speed changing signal, the reference magnetic pole switching circuit selects one of the plurality of time intervals according to the change in the rotational speed of the motor, and the reference magnetic pole switching circuit uses the magnetic pole detected data detected within the one of the plurality of time intervals as the reference magnetic pole data of a next one of the plurality of time intervals; and
   a motor driving circuit connected to the reference magnetic pole switching circuit and the motor, and configured to drive the motor according to the magnetic pole reference data from the reference magnetic pole switching circuit.

2. The motor driver according to claim 1, wherein the reference magnetic pole switching circuit samples the rotational speed of the motor that is indicated by the motor rotational speed changing signal at intervals, the reference magnetic pole switching circuit determines the change in the rotational speed of the motor over time according to the rotational speed of the motor that is sampled respectively at different time points within a sampling time interval, the reference magnetic pole switching circuit selects the one of the plurality of time intervals according to the change in the rotational speed of the motor over time.

3. The motor driver according to claim 1, wherein the reference magnetic pole switching circuit continuously samples the rotational speed of the motor that is indicated by the motor rotational speed changing signal for multiple times to determine the change in the rotational speed of the motor over time within a sampling time interval.

4. The motor driver according to claim 1, wherein the reference magnetic pole switching circuit, according to the motor rotational speed changing signal, determines whether or not a transient change is occurring in the rotational speed of the motor to select the one of the plurality of time intervals.

5. The motor driver according to claim 1, wherein, when the reference magnetic pole switching circuit determines that the rotational speed of the motor is in a steady state according to the motor rotational speed changing signal, the reference magnetic pole switching circuit uses the time interval during which the rotor of the motor is switched to one of the plurality of magnetic pole positions in one of the plurality of cycles, as the reference magnetic pole data of the time interval during which the rotor of the motor is switched to the one of the plurality of magnetic pole positions in a next one of the plurality of cycles.

6. The motor driver according to claim 1, wherein, when the reference magnetic pole switching circuit determines that the rotational speed of the motor is in a steady state according to the motor rotational speed changing signal, the reference magnetic pole switching circuit uses an average value of the time intervals during which the rotor of the motor is switched to some of the plurality of magnetic pole positions respectively in one of the plurality of cycles, as the reference magnetic pole data of the time intervals during which the rotor of the motor is switched to the some of the plurality of magnetic pole positions respectively in a next one of the plurality of cycles.

7. The motor driver according to claim 1, wherein, when the reference magnetic pole switching circuit determines that the rotational speed of the motor is in a steady state according to the motor rotational speed changing signal, the reference magnetic pole switching circuit uses an average value of the plurality of time intervals during which the rotor of the motor is switched respectively to all of the plurality of magnetic pole positions in one of the plurality of cycles, as the reference magnetic pole data of the plurality of time intervals during which the rotor of the motor is switched respectively to all of the plurality of magnetic pole positions in a next one of the plurality of cycles.

8. The motor driver according to claim 1, wherein, when the reference magnetic pole switching circuit determines that the rotational speed of the motor is in a steady state according to the motor rotational speed changing signal, the reference magnetic pole switching circuit uses an average value of the time intervals during which the rotor of the motor is switched respectively to some of the plurality of magnetic pole positions in one of the plurality of cycles, as the reference magnetic pole data of the time intervals during which the rotor of the motor is switched to others of the plurality of magnetic pole positions in the one of the plurality of cycles.

9. The motor driver according to claim 1, wherein, when the reference magnetic pole switching circuit determines that a transient change is occurring in the rotational speed of the motor rotating within one of the plurality of time intervals according to the motor rotational speed changing signal, the reference magnetic pole switching circuit selects a previous one of the plurality of time intervals and uses the magnetic pole detected data detected within the previous one of the plurality of time intervals as the reference magnetic pole data of the one of the plurality of time intervals.

10. The motor driver according to claim 1, wherein, when the reference magnetic pole switching circuit determines that a transient change is occurring in the rotational speed of the motor according to the motor rotational speed changing signal, the motor driving circuit adjusts a commutation time of the motor according to the reference magnetic pole data.

11. The motor driver according to claim 1, wherein the motor driving circuit is connected to the motor position detecting circuit, and configured to drive the motor according to both of the commutation signal and the reference magnetic pole data.

12. The motor driver according to claim 1, wherein the motor driving circuit includes:
   a control circuit connected to the reference magnetic pole switching circuit;
   a driving circuit connected to the control circuit; and
   an output stage circuit connected to the driving circuit and the motor;
   wherein the control circuit is configured to control the driving circuit to drive the output stage circuit so as to drive the motor according to the reference magnetic pole data from the reference magnetic pole switching circuit.

13. The motor driver according to claim 12, wherein the output stage circuit includes a plurality of switch components, and the plurality of switch components includes a plurality of high-side switches and a plurality of low-side switches.

14. The motor driver according to claim 13, wherein, when the reference magnetic pole switching circuit determines that a transient change is occurring in the rotational speed of the motor according to the motor rotational speed changing signal, the control circuit controls the driving circuit to extend a period of time within which one or more of the plurality of low-side switches are turned off according to the reference magnetic pole data.

15. The motor driver according to claim 13, wherein, when the reference magnetic pole switching circuit determines that a transient change is occurring in the rotational speed of the motor according to the motor rotational speed changing signal, the control circuit controls the driving circuit to extend a period of time within which one or more of the plurality of switch components are switched according to the reference magnetic pole data.

16. The motor driver according to claim 1, wherein the rotational speed detecting circuit is connected to the motor position detecting circuit, and when the rotational speed detecting circuit receives the commutation signal from the motor position detecting circuit and detects the rotational speed of the motor to output the motor rotational speed changing signal, the rotational speed detecting circuit controls the reference magnetic pole switching circuit to store the magnetic pole position at which the rotor of the motor rotates at a current rotational speed as the magnetic pole detected data.

* * * * *